Dec. 28, 1965    SONIA BORIS NEE JOKELSON    3,226,035
VAPORIZER HAVING FIRST AND SECOND PISTON CONSTRUCTION
Filed March 23, 1964    2 Sheets-Sheet 2

3,226,035
VAPORIZER HAVING FIRST AND SECOND
PISTON CONSTRUCTION
Sonia Boris, nee Jokelson, Paris, France, assignor to
Societe Technique de Pulverisation (par abreviation
STEP), Boulogne-sur-Seine, France, a French company
Filed Mar. 23, 1964, Ser. No. 353,973
Claims priority, application France, May 3, 1963,
933,544
5 Claims. (Cl. 239—361)

This invention relates to vapourisers of the kind which comprise a cylinder-and-piston assembly constituting an air compressor having a variable volume chamber, and one of whose components (the cylinder or the piston) serves to close a receptacle containing the liquid to be vapourised, the other component being connected to an element capable of sealing off a connection between the receptacle and a vapourising jet, and including resilient means which act to bias the relatively movable components towards a position in which the sealing element seals the connection between the receptacle and the vapourising jet in such a way that the vapouriser is tightly sealed when not in use.

Vapourisers of this type which have so far appeared must be operated in an upside down position, in order to allow the liquid to be vapourised to escape gravitationally from the receptacle into the vapourising jet, either directly, or by way of a chamber lined with an absorbent substance.

The object of the present invention is an improvement to vapourisers of this type enabling them to be used with the receptacle in an upright position.

According to the present invention, a vapouriser of the kind set forth includes a pumping chamber having an extension in the form of a plunger tube which can penetrate into the receptacle containing the liquid to be vapourised and which carries a non-reutrn valve, the sealing element being mounted for movement in the pumping chamber to provide not only a seal between the receptacle and the vapourising jet when in a rest position but also a piston which can act to force liquid from the pumping chamber to the jet.

The pumping chamber can be connected to the vapourising jet, either directly, or by way of a subsidiary chamber which may or may hot be lined with an absorbent substance.

Moreover, the sealing component can be constituted by a valve which may be connected to one of the relatively movable components, either to the cylinder or to the piston by a solid member, or by a hollow member which may or may not be lined with absorbent substance and which can connect the pumping chamber and the vapourising jet.

The hollow member may be provided with an aperture which acts in co-operation with a sealing member to provide a valve between the interior of the hollow member and the pumping chamber.

In any case the vapourising jet may be carried by the piston or the cylinder of the air compressor as is convenient.

The invention may be performed in various ways but three embodiments will now be described by way of example and with reference to the accompanying drawings in which.

Figure 1:
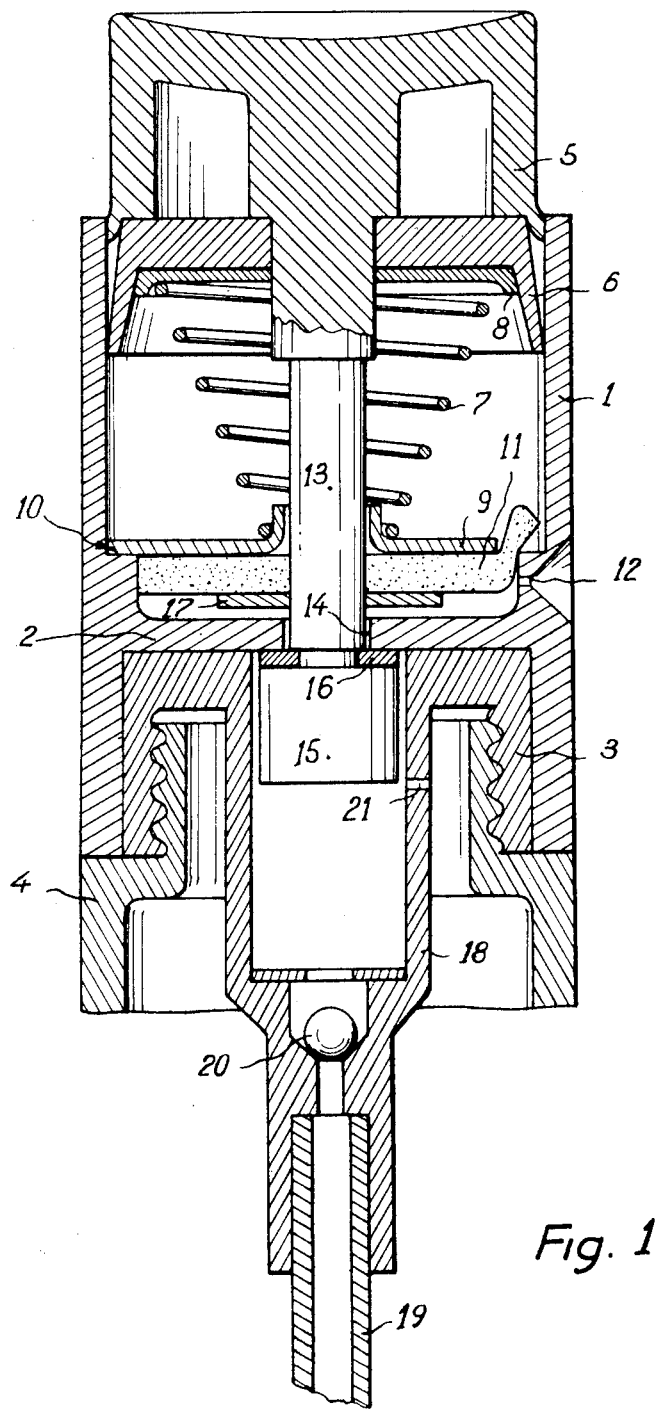
FIGURE 1 shows an axial section of the first exemplary embodiment.

In the embodiment shown in FIGURE 1, the vapouriser comprises an air compressor formed by a cylinder 1 supplied with a transverse partition 2. In the cylinder 1 below the partition 2 a threaded plastic sleeve 3 is press fitted which enables the cyilnder 1 to be attached to the neck of the bottle 4 containing the liquid to be vapourised.

A piston which is constituted by a push button 5 to which a cup seal 6 is attached is movably mounted in the cylinder 1 to provide a variable volume chamber between it and the partition 2. A spring 7 is situated between a seating washer 8 which is cemented onto the base of the cup seal 6 and a washer 9 which seats on a shoulder 10 which is provided in the inside wall of the cylinder 1.

The washer 9, in association with the partition 2, forms a subsidiary chamber in the interior of which an absorbent substance 11 is situated and which is connected to the exterior by an atomiser jet 12 discharging opposite the absorbent substance 11.

The push button 5 is connected to a rod 13 which passes, with a certain amount of play, through a channel formed by an axial orifice 14 provided in the partition 2, to a valve which is situated in the exterior of the partition 2 and which comprises a piston 15 and a joint seal 16. A washer 17 placed between the partition 2 and the absorbent substance 11, can slide with a certain amount of friction onto the rod 13.

The sleeve 3 is integral with a pumping chamber 18 to the lower part of which a plunger tube 19 is attached which extends almost down to the bottom of the bottle 4. At the lower part of the pumping chamber 18 a ball 20 is situated forming a valve and preventing the liquid in the chamber 18 from returning to the bottle via the plunger tube 19. Finally the chamber 18 is equipped with an escape orifice 21 in its upper portion. It will be seen that the piston 15 acts as a seal between the bottle and the jet 12 at the same time acting as a piston in the pumping chamber 18.

In order to use the vapouriser just described it is fixed onto the bottle 4 and the push button 5 is pressed while the bottle is in its normal position the cylinder 1 thus being on top of the bottle. When the push button 5 moves it actuates the piston 15 which projects into the chamber 18. When the pressure is removed from the push button, it returns to its original position, due to the spring 7, which actuates the valve 15. A drop in pressure now occurs in the chamber which has the effect of making some of the liquid, which is situated in the bottle 4, rise by way of the plunger tube 19. The liquid is then prevented from returning to the bottle by the valve 20.

When the push button 5 is pressed again, the liquid in the chamber 18 is forced back via the clearance existing between the orifice 14 and the rod 13 and impregnates the absorbent substance 11; a part of the liquid escapes via the orifice 21, which orifice limits the quantity of liquid thus forced back.

In addition, when the piston 6 slides into the cylinder 1, it compresses the air which is in the cylinder. This air escapes via the jet 12, through the absorbent substance 11 impregnated with liquid, and thus entrains liquid which is vapourised by the orifice 12. If the push button 5 is pressed one or more times the process just described is repeated, that is to say that liquid is sucked into the pumping chamber 18, forced via the piston 15 and its rod 13 into the absorbent substance 11 and finally carried along by the compressed air in the cylinder 1 and vapourised at the jet 12. In the rest state, the piston 15 is kept on its seat by the spring 7 in such a way that the vapouriser is sealed.

Figure 2:
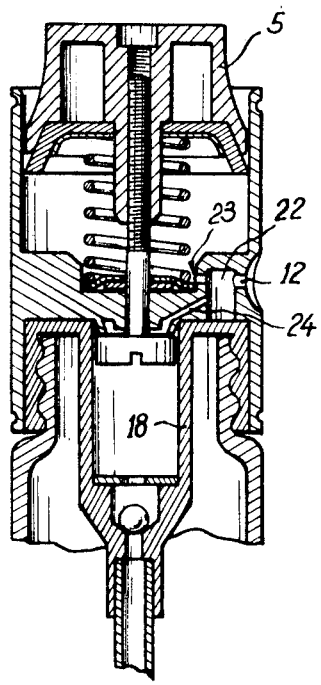
FIGURE 2 is a similar view as shown in FIGURE 1 of a second exemplary embodiment, and, FIGURE 3 is a view similar to that of FIGURE 1 of a third exemplary embodiment.

The embodiment of FIGURE 2 is somewhat similar to that of FIGURE 1, however it is not equipped with absorbent substance. A subsidiary chamber 22 is formed in the partition of the cylinder 1. This chamber is connected via an orifice 23 with the interior of the cylinder 1, with the exterior via the vapourising jet 12, and with the pumping chamber 18 via a channel 24. The latter is placed in such a way as to be closed off by the piston 15 when this is in the rest position.

When the push button 5 is pressed, the liquid to be vapourised is sucked into the pumping chamber 18 and next forced through the passage 24, into the chamber 22 where it meets the air which is compressed in the cylinder 1 by the piston 5 and which penetrates into the chamber via the orifice 23. This air ensures the vapourisation of the liquid, which leaves the jet in vapourised form.

Figure 3:
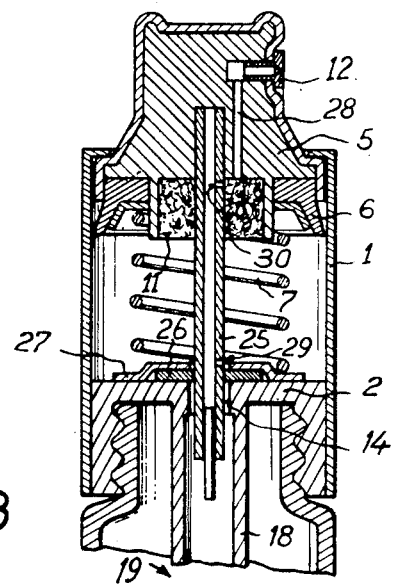

In the embodiment of FIGURE 3, the push button 5 is integral with a hollow member in the form of a rod 25 which is slidably mounted with a certain amount of play in the orifice 14 of the partition 2. A seal member in the form of a washer 26 attached to the external face of this partition, is held in place by a member 27 and ensures sealing.

The chamber in which the absorbent substance 11 is situated is formed in the interior of the push button 5 and a passage 28 is provided which ends at the vapourising jet 12.

The rod 25 has two apertures 29 and 30 which, when the vapouriser is in the rest position, are situated in the following manner, one near the washer 26, but outside the same, the other level with the upper part of the variable valve chamber filled with absorbent substance. The lower extremity of the rod 25 engages with the pumping chamber 18 which, as was the case in the previous exemplary embodiment, is extended as a plunger tube 19.

When the push button 5 is moved, the liquid to be vapourised is sucked into the chamber 18, forced by the rod 25 into the annular space existing between the partition 2 and the rod and penetrates into the latter via the orifice 29.

To the extent that any of the liquid is returned to the rod 25, its level in this rod is raised and ends by reaching the aperture 30, the liquid then leaving the rod in order to impregnate the absorbent substance 11.

When the substance is impregnated with the liquid, the air which is compressed in the cylinder 1 at the time of the operation of the push button, escapes via the channel 28 thus entraining the liquid which leaves the jet 12 in vapourised form.

When the vapouriser is in the rest state, it is again sealed by the washer 26 which cooperates with the rod 25, the latter at the same time constituting a sealing element and a return valve.

I claim:
1. A vaporizer for vaporizing liquids comprising a cylinder, a first piston manually actuated for movement within said cylinder, a vaporizing jet in pneumatic communication with said cylinder, a pumping chamber, a second piston, said second piston being within said pumping chamber, a rod, said rod connecting said first piston with said second piston so that both of said pistons move in unison when said first piston is actuated, spring means, said spring means biasing said first and second pistons toward a rest position, a channel, said channel extending from said pumping chamber to place said chamber in communication with said vaporizing jet and positioned so that when in said rest position said second piston covers said channel so that said pumping chamber is sealed off from said vaporizing jet, a plunger tube extending into said liquid to conduct liquid to said pumping chamber, and a valve, said valve positioned between said plunger tube and said pumping chamber to permit said liquid to enter said pumping chamber and to prevent said liquid from leaving said pumping chamber through said plunger tube.

2. A vaporizer as defined in claim 1 wherein said vaporizing jet is formed in said cylinder.

3. A vaporizer as defined in claim 1, further defined by an element of absorbent substance, said element positioned so as to be in communication with said pumping chamber through said channel and also in communication with said vaporizing jet.

4. The vaporizer defined in claim 1 further defined by a subsidiary chamber, said subsidiary chamber being in communication with said pumping chamber through said channel and also in communication with said vaporizing jet.

5. The vaporizer defined in claim 1, further defined by a joint seal, said seal mounted on said second piston so that when said second piston is in said rest position said seal is engaged by said channel.

References Cited by the Examiner

UNITED STATES PATENTS

| 2,760,822 | 8/1956 | Boris et al. | 239—355 |
| 3,092,331 | 6/1963 | Kiashek | 239—355 |
| 3,162,372 | 11/1964 | Viard | 239—361 |

FOREIGN PATENTS 308,255  12/1929  Great Britain.

M. HENSON WOOD, JR., *Primary Examiner.*

R. S. STROBEL, *Assistant Examiner.*